J. S. McCLURG.
AUTOMOBILE TIRE.
APPLICATION FILED DEC. 24, 1919.
1,400,301. Patented Dec. 13, 1921.
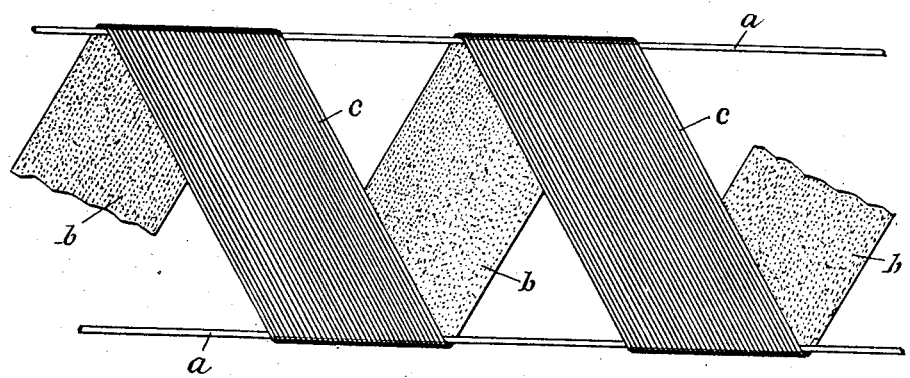
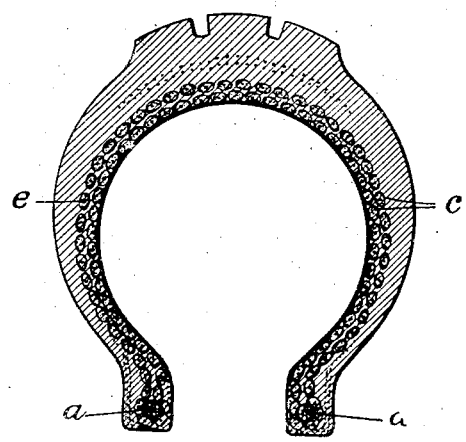
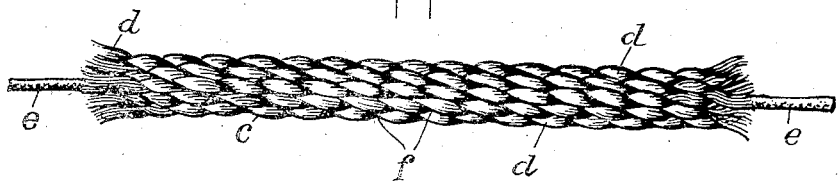
WITNESSES
INVENTOR
JOHN S. McCLURG
BY
ATTORNEYS

UNITED STATES PATENT OFFICE.

JOHN S. McCLURG, OF NEW YORK, N. Y., ASSIGNOR, BY MESNE ASSIGNMENTS, TO CARLISLE TIRE CORPORATION, A CORPORATION OF DELAWARE.

AUTOMOBILE-TIRE.

1,400,301.          Specification of Letters Patent.     Patented Dec. 13, 1921.

Application filed December 24, 1919. Serial No. 347,224.

*To all whom it may concern:*

Be it known that I, JOHN S. McCLURG, a citizen of the United States, and resident of the borough of Manhattan, city and State of New York, have invented certain new and useful Improvements in Automobile-Tires, of which the following is a specification.

This invention relates to that element of automobile tires commonly known as the casing or the shoe, and particularly to such casings as are built around a fabric base consisting of continuous cords such, for example as shown in the patent to Carlisle, No. 1,294,330 or more specifically as shown in the patent to Carlisle, No. 1,345,994 of July 6, 1920.

The object of the present invention is to invest such casings with greater capacity for endurance and longevity, resilience and resistance against destructive agencies effective during the use of the tire on the road and numerous other beneficial qualities.

The structure in which the invention is incorporated is illustrated in the accompanying drawings in which Figure 1 indicates the manner in which the cords of the carcass are incorporated therein; Fig. 2 is a sectional view of the casing and Fig. 3 is a detail of the type of cord.

The carcasses for the casings to which the present application relates are prepared by first laying a series of parallel rubberized cords $c$ upon a sheet of rubber $b$ to form a band. Two annular elements are then suitably supported in an appropriate machine in such a way as to permit the band composed of the rubber sheet $b$ and the parallel rubber impregnated cords $c$ thereon to be wound about the said annular members $a$ in the manner shown in Fig. 1 of the drawings. The windings are continued until a complete cylinder is formed, the outside of the cylinder being composed of a series of adjacent parallel cords extending in one direction, the cords constituting the inner part of the cylinder being continuous therewith but extending in the opposite direction. The cylindrical unit thus formed is shaped upon an air bag, the tread, side walls, etc., are applied and the casing is then vulcanized. A section through such a casing is shown in Fig. 2, from which it will be observed that the conversion of the cylindrical parallel cord unit into the U-shaped form has isolated the individual cords from each other, each strand being surrounded by rubber on all sides in the final product. These rearrangements of the positions of the various cords involve a drain upon their stretching capacities and if the stretch is all taken out of the cords in the final casing shown in Fig. 2 no amount of strength in the cord will be able to withstand the strains of actual traffic for any very great length of time. The manipulations and the material of which the cord is constituted must, therefore, be such as to allow for the preservation of the stretching capacity in the cords as contained in the final vulcanized finished casing. As shown in Fig. 2, the annular members $a$ in the finished casing occupy that part of the casing which is known as the bead.

The cord which is employed in producing tires according to the present invention is illustrated in Fig. 3. It is known as a solid braided cord. This cord is composed of ten or twelve or other suitable number of individual strands $d$ braided together into a solid round cord preferably about a core thread $e$ constituted of unvulcanized rubber. The interbraiding of the strands $d$ causes them to cross each other repeatedly as at $f$ and the length of the strands at their respective points of crossing with another strand may be designated as a stitch. The core thread $e$ may be a rubberized thread or a rubber thread and the rubber of said thread will during vulcanization tend to permeate the cord in an outward direction. A cord such as illustrated in Fig. 3 (except for the rubber core thread) does not require more particular description by reason of the fact that it is for uses wholly diverse from those constituting the present invention well known upon the market as, for example, sash cord purposes, trolley cord, conveyer belts and similar objects.

Heretofore in the manufacture of tire casings of the type entitled to be designated cord tires, that is, tires involving the use of continuous strands of cord repeatedly and continuously passing back and forth from bead to bead, twisted cords made from various sizes of cotton yarn twisted into strands, three or four of such strands being then made into a cord or cable by a rope-laying process were used. For the purpose of achieving the dominant consideration, to wit, adequate tensile strength, such a twisted cord was the only known satisfactory available material. I have found, however, that a cord composed of smaller strands or strands so united as not to take up directly the tensile strains imposed thereon, although apparently a self-condemned absurdity would yield astonishingly satisfactory results. Instead of the standard twisted cord I use a braided cord consisting of ten or twelve strands of yarn braided together into a solid round cord.

Experiments in connection with the use of such braided cords have proven that the flexing factor shows an increase over the flexing factor in twisted cord of about 20 to 1, and at the same time the braided cord possesses may other advantages over twisted cord. For example, the friction is reduced to a minimum because each stitch, as I may call it, acts as a hinge thereby reducing the friction on the fibers of cotton during a flexing process. Inasmuch as the braided cord has a multiplicity of strands, say twelve, as against three or four for twisted cord, a factor of safety is developed since the breaking or cutting of one of the strands of the braided cord will not materially reduce the value of what remains, whereas if one of the strands of twisted cord is broken or cut, a very material reduction in effective value is brought about. In braided cord the separation of the cord itself is reduced to a minimum as each stitch is interlocked with the other every $\frac{1}{8}''$ or say approximately nine times every inch of cord where the cotton staple is $1\frac{1}{8}''$ long such as in the best Peeler cotton, whereas there are approximately two locks per inch in twisted cord. The braided cord structure is very elastic, permitting of a perfect control over the factors of flexing and stretch, while at the same time a perfect diameter can be maintained. It is also more porous and permits the rubber cement to impregnate the cord structure more thoroughly. Almost perfect uniformity of the strength, stretch and flexing factors can be maintained by the use of the braiding process, which means putting an equal strain on each and every cord which composes the tire carcass. Waste and labor are also greatly reduced inasmuch as braided cord man be made in continuous lengths of 7500 feet or so, a supply for approximately 300 tires, which can thus be run without change of creels, whereas in twisted cord only about 60 tires can be run without change of creels. The rubber core $e$ previously mentioned which may serve as a guide in the manufacture of the braided cord, adds to the efficiency of said cord as a whole, when the latter has become part of the finished vulcanized casing and thus still further improves a tire casing embodying the same. In practice, since the core $e$ is of rubber or rubberized material it will work itself outwardly into the interstices between the strands constituting the braided cord (especially as the cord is then under tension thereby in part through its own behavior forcing this action) while the outer rubber will work itself toward the interior, all during the process of vulcanization of the tire; that is to say, the rubber of the core, like the outer layers of rubber, serve as a filling to protect the strands of the cord against friction, these fillings, taken all in all, flowing during vulcanization into the proper spaces that may be open to them.

In the present case I do not claim the use of braided cord *per se* without the core above mentioned (whatever rights I may have in that respect being reserved in a separate application filed September 3, 1921, Serial No. 498,230) but I do herein claim such cord when employed in tire carcasses or casings in the construction of which there are used solid, braided cords which have the described special inner core of unvulcanized rubber, the cord as a whole being impregnated with rubber.

I claim:

In a tire casing of the type comprising two annular bead members and continuous strands of cord wound spirally about the same, that improvement which consists in the employment of solid braided cord impregnated with rubber having an inner core comprising unvulcanized rubber.

In testimony whereof I have hereunto set my hand.

JOHN S. McCLURG.